United States Patent
Kwon et al.

(12)

(10) Patent No.: US 6,221,969 B1
(45) Date of Patent: Apr. 24, 2001

(54) METHOD FOR PRODUCING RUBBER-MODIFIED STYRENIC RESIN HAVING HIGH GLOSS AND HIGH IMPACT STRENGTH

(75) Inventors: Oh-jin Kwon; Yong-jun Kim; Hyung-sub Lee, all of Yocheon (KR)

(73) Assignee: LG Chemical, Ltd. (KR)

( * ) Notice: Subject to any disclaimer, the term of this patent is extended or adjusted under 35 U.S.C. 154(b) by 0 days.

(21) Appl. No.: 09/274,278

(22) Filed: Mar. 22, 1999

(30) Foreign Application Priority Data

Mar. 23, 1998 (KR) .................................................. 98-9906

(51) Int. Cl.[7] ........................ C08F 255/00; C08F 279/02; C08F 279/04
(52) U.S. Cl. .......................... 525/316; 525/70; 525/71; 525/83; 525/84; 525/243
(58) Field of Search ............................ 525/316, 71, 70, 525/83, 84, 243

(56) References Cited

U.S. PATENT DOCUMENTS

| | | | |
|---|---|---|---|
| 4,146,589 | 3/1979 | Dupre | 525/314 |
| 4,493,922 | 1/1985 | Echte et al. | 525/314 |
| 5,244,977 | * 9/1993 | Hayakawa et al. | 525/316 |
| 6,114,461 | * 9/2000 | Preti et al. | 525/298 |

FOREIGN PATENT DOCUMENTS

| | | |
|---|---|---|
| 0 412 801 A1 | 8/1990 | (EP) . |
| 46-41467 | 12/1971 | (JP) . |
| 59-1519 | 1/1984 | (JP) . |
| 63-112646 | 5/1988 | (JP) . |
| 63-241053 | 10/1988 | (JP) . |
| 64-74209 | 3/1989 | (JP) . |
| 2-38435 | 8/1990 | (JP) . |
| 03-199212 | 8/1991 | (JP) . |

\* cited by examiner

*Primary Examiner*—James J. Seidleck
*Assistant Examiner*—Olga Asinossky
(74) *Attorney, Agent, or Firm*—Knobbe, Martens, Olson & Bear, LLP

(57) ABSTRACT

Disclosed is a method for producing a rubber-modified styrenic resin. The method includes the steps of (a) producing a rubber solution by dissolving a rubber polymer in a vinyl monomer; (b) producing a rubber composition by continuously supplying the above rubber solution in a first reactor to polymerize the rubber polymer with the vinyl monomer at a reaction temperature of 120°–145° C. to perform phase inversion of the rubber polymer, thereby producing the polymer of conversion ratio of 10–40 wt %, and realized through 50–99% of rubber particles having an average particle diameter of 0.1–0.5 $\mu$m, and 1–50% of rubber particles having an average particle diameter of 1–5 $\mu$m; (c) performing polymerization until conversion ratio reaches 70–90% by continuously supplying a reactant solution produced in the first reactor in a second, third and fourth reactor; and (d) separating the polymer containing a rubber component from unreacted monomer by continuously supplying a reaction solution resulting from the fourth reactor to a devolatilizer.

16 Claims, No Drawings

METHOD FOR PRODUCING RUBBER-MODIFIED STYRENIC RESIN HAVING HIGH GLOSS AND HIGH IMPACT STRENGTH

CROSS-REFERENCE TO RELATED APPLICATIONS

This invention is based on application No. 98-8906 filed with the Korean Industrial Property Office on Mar. 23, 1998, the content of which is incorporated herein by reference.

BACKGROUND OF THE INVENTION

1. Field of the Invention

The present invention relates to a method for producing a rubber-modified styrenic resin, and more particularly to a continuous method for producing a rubber-modified styrenic resin in which molded articles made from the styrenic resin are highly scratch-resistant and impact-resistant, and have a high gloss.

2. Description of the Related Art

Typically, to obtain both high gloss and high impact strength in a styrenic resin, either a rubber polymer is blended in a styrenic resin or, in a state where a rubber polymer is present, styrene is polymerized, and a portion of the styrene in the rubber polymer is grafted while a remaining portion of the styrene, which is a polystyrene-polymerized rubber-modified styrenic resin, is used as material for parts in electrical and electronic products, sheets, etc.

With regard to the rubber polymer used above, it is well known that particles therein are dispersed in the styrenic polymer, with a close correlation existing between a size of these particles and properties such as gloss, rigidity and impact strength of the resulting styrenic resin. That is, rigidity and gloss improve, while resistance to impact is reduced with decreases in the size of the particles of the rubber polymer. An increase in particle size has the opposite effect on these properties. However, there is a limit to improvements in impact-resistance realized with increases in particle size of the rubber polymer.

Accordingly, to improve gloss while maintaining impact strength of molded products, JP 46-41467, JP 59-1519, JP 63-241053 and U.S. Pat. No. 4,146,589, for example, disclose methods of blending impact-resistant styrenic resin having a rubber particle size of 1.0 μm and larger. However, gloss is minimally improved in the rubber-modified styrenic resin produced using these methods.

To overcome the above disadvantage, JP 48-185945 and JP 64-74209 disclose methods for producing a styrenic resin which provides high gloss and high transparency to resulting molded products by using a well-known process [Angew Markromol. Chem. 58/59, p. 157–158(1977)]. In this process, rubber particles of less than 0.5 μm and having a core-shell structure are produced by performing polymerization utilizing a styrene-butadiene block copolymer with a high styrene content as a rubber component. However, surface gloss of molded products manufactured using this material is not greatly improved.

Also, U.S. Pat. No. 4,493,922 and JP 63-112646 disclose methods in which the above styrenic resin is blended with common impact-resistant styrenic resin having a small amount rubber particles with a cell structure to maintain high gloss of the resulting molded product while improving impact strength of the same. In the material resulting from these methods, although impact resistance is significantly improved, since gloss is actually diminished, it is necessary to add polymethylsiloxane to the resin and to either blend the resin in an extruder or mix the resin in a polymerizing reactor with a small and large particle rubber polymerizing solutions. These additional processes complicate the methods.

Further, JP 2-38435 discloses a method for producing a resin using a bulk-suspension polymerization, two-stage polymerization method; EP 412801 discloses a method in which two rubber polymerizing solutions, one with a small particle size and the other with a large particle size, are separately produced in different reactors, then mixed in a subsequent process; and JP 3-199212 discloses a method in which a large particle polymerization solution is produced in a first reactor, and a small particle raw material solution is mixed with the large particle polymerization solution in a second reactor. However, in the above three methods, difficulties in establishing operation conditions for the processes used in the methods arise, and overall costs for manufacture are high.

SUMMARY OF THE INVENTION

The present invention has been made in an effort to solve the above problems.

It is an object of the present invention to provide a continuous method for producing a rubber-modified styrenic resin having rubber particles of two different sizes in a dispersed phase such that molded articles made from the styrenic resin exhibit high gloss and high impact strength.

To achieve the above object, the present invention provides a method for producing a rubber-modified styrenic resin including the steps of (a) producing a rubber solution by dissolving a rubber polymer in a vinyl monomer; (b) producing a rubber composition by continuously supplying the above rubber solution in a first reactor to polymerize the rubber polymer with the vinyl monomer at a reaction temperature of 120°–145° C. to perform phase inversion of the polymer, thereby producing the polymer of conversion ratio of 10–40 wt %, and realized through 50–99% of rubber particles having an average particle diameter of 0.1–0.5 μm, and 1–50% of rubber particles having an average particle diameter of 1–5 μm; (c) performing polymerization until conversion ratio reaches 70–90% by continuously supplying a reactant solution produced in the first reactor in a second, third and fourth reactor; and (d) separating the polymer containing a rubber component from unreacted monomer by continuously supplying a reaction solution resulting from the fourth reactor to a devolatilizer.

DETAILED DESCRIPTION OF THE PREFERRED EMBODIMENTS

The present invention provides a method for producing a rubber-modified styrenic resin of the present invention having rubber particles of two different sizes in a dispersed phase, the styrenic resin having high gloss and high impact strength. The inventive method includes the steps of:

(a) producing a rubber solution by dissolving a rubber polymer in a vinyl monomer;

(b) producing a polymer by continuously supplying the above rubber solution in a first reactor to polymerize the rubber polymer with the vinyl monomer at a reaction temperature of 120°–145° C. to perform phase inversion of the rubber polymer, thereby producing the polymer of conversion ratio of 10–40 wt %, and realized through 50–99% of rubber particles having an average particle diameter of 0.2–0.8 μm, and 1–50% of rubber particles having an average particle diameter of 1–5 μm;

(c) performing polymerization until the conversion ratio reaches 70–90% by continuously supplying a reactant solution produced in the first reactor in a second, third and fourth reactor; and (d) separating the polymer containing a rubber component from unreacted monomer by continuously supplying a reaction solution resulting from the fourth reactor to a devolatilizer.

The vinyl monomer used as a raw material in the present invention is a monomer selected from the group consisting of styrene, methylstyrene, ethylstyrene, isopropylstyrene, alkyl styrene such as butyl styrene, chlorostyrene, halogenated styrene such as bromostyrene, and halogenated alkyl styrene. Preferably, the vinyl monomer is styrene, α-methylstyrene, or p-methylstyrene.

As the rubber polymer, it is possible to use, for example, polybutadiene, styrene butadiene block copolymer rubber, an ethylene-propylene copolymer, ethylene-propylene-terpolymer copolymer rubber, butadiene-acrylonitrile copolymer rubber, or a combination of two or more of these materials.

For the rubber solution, polybutadiene, which is a rubber polymer, and styrene-butadiene block copolymer rubber are dissolved together in a styrene monomer. Here, it is possible to add a solvent of, for example, toluene, ethylbenzene, ethylxylene, or diethyl benzene.

A content of the rubber polymer is 4–20 parts by weight, preferably 6–12 parts by weight. A particle diameter, a particle diameter distribution, and a particle structure of the rubber polymer are controlled by various conditions in the inventive method including agitation rpm, a reaction temperature, a reaction time, a viscosity of the reactant solution (derived according to a composition of the reactant solution), interfacial tension, and polymerization.

The present invention is further explained in more detail with reference to the following examples. The invention can be utilized in various ways and is not intended to be confined to the examples.

EXAMPLE 1

6 parts by weight of a styrene-butadiene block copolymer (viscosity of 5% styrene solution is 30 to 40 cps) and 4 parts by weight of polybutadiene (viscosity of 5% styrene solution is 130 cps) were added to and dissolved in 18 parts by weight of ethylbenzene and 72 parts by weight of styrene, thereby producing a raw material rubber solution. The raw material rubber solution was then continuously supplied at a rate of 12 L/hour to four continuous agitation reactors- a first reactor, a second reactor, a third reactor and a fourth reactor-connected in series and having, in order, volumes of 26 L, 16 L, 16 L and 16 L.

Reaction temperatures in the first, second, third and fourth reactors were respectively 135° C., 140° C., 150° C. and 155° C., and polymerizing solutions were continuously supplied to each reactor. In the fourth reactor, a reaction solution was continuously supplied to a conventional devolatilizer, and after separating an unreacted monomer and solvent from the polymer solution at a high temperature of 220° C. to 240° C. and at a reduced pressure of 10 to 20 torr, the polymer solution was extracted as pellets using a gear pump, thereby obtaining a high gloss and high impact strength rubber-modified styrenic resin.

The obtained resin was examined by an electron microscope and it was determined that a dispersed phase of the resin included 90% having a cell structure with an average particle diameter of 0.1–0.5 μm, and the remaining 10% having a cell structure with an average particle diameter of 1–5 μm. Further the resin according to Example 1 was molded into a predetermined shape and, using an ASTM D256 test method to measure Izod impact strength, and a JIS-K-7105 test method to measure surface gloss of the molded product, it was determined that the Izod impact strength was 13.2 kg(cm)/cm and the surface gloss was 103%. These measurements appear in Table 1 below.

EXAMPLE 2

Except for a reaction temperature of 145° C. for the first reactor, the same method as that used in Example 1 was used to produce rubber-modified styrenic resin.

EXAMPLE 3

Except for a reaction temperature of 128° C. for the first reactor, the same method as that used in Example 1 was used to produce rubber-modified styrenic resin.

EXAMPLE 4

Except for using 77 parts by weight of styrene, 23 parts by weight of ethylbenzene, 7 parts by weight of a styrene-butadiene block copolymer, and 3 parts by weight of polybutadiene, the same method as that used in Example 1 was used to produce rubber-modified styrenic resin.

EXAMPLE 5

Except for using 70 parts by weight of styrene, 25 parts by weight of ethylbenzene, 2 parts by weight of a styrene-butadiene block copolymer, and 3 parts by weight of polybutadiene, the same method as that used in Example 1 was used to produce rubber-modified styrenic resin.

EXAMPLE 6

Except for using 72 parts by weight of styrene, 18 parts by weight of ethylbenzene, 7 parts by weight of a styrene-butadiene block copolymer, and 3 parts by weight of polybutadiene, the same method as that used in Example 1 was used to produce rubber-modified styrenic resin.

EXAMPLE 7

Except for using 74 parts by weight of styrene, 16 parts by weight of ethylbenzene, 5 parts by weight of a styrene-butadiene block copolymer, and 5 parts by weight of polybutadiene, the same method as that used in Example 1 was used to produce rubber-modified styrenic resin.

TABLE 1

|  | Unit of Measure | Example 1 | Example 2 | Example 3 |
|---|---|---|---|---|
| Final conversion rate | Parts by weight | 82 | 84 | 81 |
| Ratio of average particle diameter of 0.1–0.5 μm | % | 80 | 85 | 70 |
| Ratio of average particle diameter of 1–5 μm | % | 20 | 15 | 30 |
| Izod* impact strength | kg(cm)/cm | 13.2 | 11.1 | 14.0 |
| Gloss** | % | 103 | 106 | 95 |

TABLE 2

|  | Example 4 | Example 5 | Example 6 | Example 7 |
|---|---|---|---|---|
| Final conversion rate (parts by weight) | 78 | 76 | 85 | 82 |

TABLE 2-continued

|  | Example 4 | Example 5 | Example 6 | Example 7 |
|---|---|---|---|---|
| Ratio of average particle diameter of 0.1–0.5 μm (%) | 81 | 62 | 91 | 83 |
| Ratio of particle diameter of 1–5 μm (%) | 19 | 38 | 9 | 17 |
| Izod* impact strength (kgxcm/cm) | 10.4 | 6.5 | 10.1 | 9.2 |
| Gloss** (%) | 103 | 95 | 105 | 95 |

*ASTM D-256 ¼" x ½" Notch
**JIS-K-7105 incidence angle 45°

Mold conditions: 5 oz. extraction mold, mold temperature of 210° C., and die temperature of 60° C.
*: ASTM D-256 ¼"x½" Notch
**: JIS-K-7105 incidence angle 45°

Using the methods of the present invention to produce rubber-modified styrenic resin, both impact strength and surface gloss of molded articles made from the styrenic resin are improved.

While this invention has been described in connection with what is presently considered to be the most practical and preferred examples, it is to understood that the invention is not limited to the disclosed examples, but, on the contrary, is intended to cover the various modifications and equivalent arrangements included within the spirit and scope of the appended claims.

What is claimed is:

1. A method of producing a styrenic resin, comprising:
   dissolving at least two different rubbers in a vinyl monomer in the presence of a solvent consisting essentially of one or more non-polar hydrocarbons to form a rubber solution, the vinyl monomer being selected from the group consisting of styrene, halogenated styrene, alkyl styrene, and halogenated alkyl styrene; and thereafter
   polymerizing the vinyl monomer in the rubber solution, thereby producing a styrenic resin with particles of the at least two different rubbers dispersed therein.

2. The method as defined in claim 1, wherein the alkyl styrene is selected from the group consisting of methylstyrene, ethylstyrene, isopropylstyrene, and butylstyrene.

3. The method as defined in claim 2, wherein the methylstyrene is α-methylstyrene or ρ-methylstyrene.

4. The method as defined in claim 1, wherein the at least two different rubbers are selected from the group consisting of polybutadiene rubber, styrene-butadiene copolymer rubber, ethylene-propylene-terpolymer copolymer rubber, and butadiene-acrylonitrile copolymer rubber.

5. The method as defined in claim 4, wherein the at least two different rubbers comprise polybutadiene rubber and styrene-butadiene copolymer rubber.

6. The method as defined in claim 5, wherein with reference to a total amount of the at least two different rubber, each rubber is in an amount of 30–70 parts by weight.

7. The method as defined in claim 1, wherein the solvent is selected from the group consisting of toluene, ethylbenzene, ethylxylene, and diethyl benzene.

8. The method as defined in claim 1, wherein the at least two different rubbers are in an amount of 4–20 parts by weight in the rubber solution.

9. The method as defined in claim 8, wherein the at least two different rubbers are in an amount of 6–12 parts by weight in the rubber solution.

10. The method as defined in claim 1, wherein the polymerization is initiated by applying heat to the rubber solution.

11. The method as defined in claim 1, wherein the polymerization is performed at a temperature of 120°–145° C.

12. The method as defined in claim 1, wherein the polymerization is performed in a continuous mode, wherein the rubber solution is continuously fed into a reactor and the styrenic resin produced is discharged therefrom.

13. The method as defined in claim 12, wherein the reactor comprises a plurality of reaction vessel connected one by one, wherein each reaction vessel is set at a temperature different from one another.

14. The method as defined in claim 1, further comprising the step of molding the styrenic resin into a shape.

15. A styrenic resin produced by the method as defined in claim 1, wherein when molded at 210° C. with a die temperature of 60° C., the resin has a Izod impart strength of 6.5–14 kg(cm)/cm when tested using an ASTM D256.

16. A styrenic resin produced by the method as defined in claim 1, wherein when molded at 210° C. with a die temperature of 60° C., the resin has a surface gloss of 95–106% when tested using JIS-K-7105.

* * * * *